United States Patent Office 3,070,601
Patented Dec. 25, 1962

3,070,601
PROCESS FOR THE PRODUCTION OF CYANURIC CHLORIDE
William R. Johnson, Texas City, Tex., assignor to Monsanto Chemical Company, St. Louis, Mo., a corporation of Delaware
No Drawing. Filed Sept. 15, 1959, Ser. No. 840,009
3 Claims. (Cl. 260—248)

The present invention relates to a process for the production of cyanuric chloride directly from hydrogen cyanide and chlorine.

Various methods are known for the preparation of cyanuric chloride. The more commonly used processes are those employing cyanogen chloride as the starting material. In one such process recently proposed, cyanogen chloride is polymerized in the liquid phase in the absence of a catalyst using liquid cyanuric chloride as a solvent. It has now been discovered that it is possible to eliminate the steps of first producing and then purifying the cyanogen chloride for subsequent polymerization in the known manner and that cyanuric chloride can be produced simply and directly from hydrogen cyanide and chlorine either in the presence or absence of a catalyst.

It is an object of the present invention to provide a novel process for the production of cyanuric chloride which is essentially simpler than those of the prior art.

It is another object of the invention to provide a novel process for producing cyanuric chloride directly from the hydrogen cyanide and chlorine.

It is a further object of the invention to provide a process for producing cyanuric chloride directly from hydrogen cyanide and chlorine which does not require a catalyst.

These and other objects and advantages of the invention which will become apparent from the following description are attained by reacting hydrogen cyanide and chlorine either in the presence or absence of a catalyst in liquid cyanuric chloride as a solvent at a temperature higher than 200° C. and preferably in the range from about 250° C. to about 450° C. Under these conditions, the pressure in the reactor corresponds to the vapor pressure of the liquid cyanuric chloride at the reaction temperature employed, that is, generally about 10 to 15 atmospheres. Cyanuric chloride of high purity is obtained in good yield from the process.

A suitable reactor for the process of the invention is a vertically disposed tube or a cylindrical pressure vessel made of corrosion-resistant material. The process is simply carried out by introducing a mixture of hydrogen cyanide and chlorine in substantially equimolecular proportions into a body of liquid cyanuric chloride (or liquid cyanuric chloride containing a catalyst) contained in the reactor and maintained at a temperature above 200° C. and removing by-product HCl from the reactor at the rate at which it is formed in the reaction. As the reaction proceeds, the level of liquid cyanuric chloride constantly rises and provision is made for either continuously or periodically removing this liquid from the lower part of the reactor. Since the reaction is an exothermic one, external cooling may be required to dissipate the heat and maintain the reaction temperature at the desired level. A sufficiently thorough mixing of the reactants is generally effected by introducing them below the level of the liquid solvent and allowing them to bubble through the solvent. Further improvement in mixing can be effected if desired by stirring and/or other suitable measures.

The preferred proportions of reactants are the stoichiometric ones for the reaction, i.e., one mole of hydrogen cyanide for each mole of chlorine. However, slight excesses of either reactant may be employed without significantly affecting the reaction.

In recovering the cyanuric chloride product, it is advantageous to discharge it from the reactor into an intermediate vessel where it is cooled in the liquid condition to a temperature lower than 200° C. The cyanuric chloride is then expanded from the intermediate vessel into a receiver at atmospheric pressure. This intermediate cooling prevents clogging of the product outlet valve which would occur if the cyanuric chloride were expanded continuously at a temperature higher than 200° C. because of partial evaporation of the cyanuric chloride and the resulting deposition of solid secondary products. A separate intermediate vessel is not required, however, if provision is made for cooling the reaction product after it leaves the reactor and prior to being allowed to expand.

The process of the invention may be carried out in the presence of catalysts although a catalyst is not required. Suitable catalysts include, for example, substances capable of accelerating Friedel-Crafts reactions, that is, metallic halides such as $AlCl_3$, $FeCl_3$, $BF_3$, $SbCl_3$ and hydrogen halides.

The invention is illustrated in the following examples which are not to be construed, however, as limiting it in any manner.

*Example 1*

A vertically-disposed tubular reactor is charged to about three-fourths of its capacity with liquid cyanuric chloride. The reactor is heated until the temperature of the cyanuric chloride reaches about 280° C. and is thereafter maintained at this temperature either by heating or cooling as required. Hydrogen cyanide and chlorine in approximately equimolecular proportions are introduced into the reactor through dip tubes which terminate below the liquid level. By-product HCl is continuously removed from a point near the top of the reactor while liquid cyanuric chloride is removed from the bottom of the reactor at a rate such as to maintain the original liquid level in the reactor. The cyanuric chloride removed is cooled in an intermediate stage to about 190° C. and then expanded into a receiver at atmospheric pressure. This cyanuric chloride product is relatively pure and is obtained in good yield.

*Example 2*

The reaction of Experiment 1 is repeated except that a quantity of aluminum chloride is dissolved in the liquid cyanuric chloride solvent prior to charging the gaseous mixture to the reactor. Cyanuric chloride is again recovered in good yield.

*Example 3*

Hydrogen cyanide and chlorine are continuously introduced in separate streams into a cylindrical pressure vessel containing a body of liquid cyanuric chloride in which a quantity of boron trifluoride has been dissolved and which is maintained at a temperature within the range from about 250° C. to about 260° C. Intimate mixing of the reactants and liquid medium is effected by bubbling the reactants through the liquid while the liquid is continuously agitated. Gaseous hydrogen chloride is continuously removed through an outlet valve near the top of the reactor at the rate at which it is formed and liquid cyanuric chloride is continuously withdrawn from the bottom of the reactor at a rate required to maintain the original level of the liquid cyanuric chloride solvent in the reactor, i.e., about half-full.

What is claimed is:

1. A process for producing cyanuric chloride which comprises reacting substantially equimolecular proportions of hydrogen cyanide and chlorine in a body of liquid cyanuric chloride under a pressure of from about 10 to about 15 atmospheres, at a temperature in the range from about 250° C. to about 400° C. and in the presence of a catalyst chosen from the group consisting of the halides of hydrogen, aluminum, boron, antimony and iron.

2. The process of claim 1 wherein the catalyst employed is aluminum chloride.

3. The process of claim 1 wherein the catalyst employed is boron trifluoride.

References Cited in the file of this patent

UNITED STATES PATENTS

| | | |
|---|---|---|
| 2,541,053 | Hartigan | Feb. 13, 1951 |
| 2,762,798 | Hardwicke et al. | Sept. 11, 1956 |
| 2,872,445 | Von Friedrich et al. | Feb. 3, 1959 |
| 2,872,446 | Von Friedrich et al. | Feb. 3, 1959 |

FOREIGN PATENTS

| | | |
|---|---|---|
| 912,220 | Germany | May 28, 1954 |
| 945,239 | Germany | July 5, 1956 |

OTHER REFERENCES

Price et al.: Journ. Soc. Chem. Indust., vol. 39, pp. 98T to 101T (1920).

Degering et al.: An Outline of Organic Nitrogen Compounds, page 530 (reaction illustrated under No. 1665), University Lithoprinters, Ypsilanti, Mich. (1945).

Migrdichian: The Chemistry of Organic Cyanogen Compounds, ASC Monograph Series No. 105, pp. 98 and 358, Reinhold Pub. Corp., 1947.